(12) United States Patent
Kwan (10) Patent No.: US 6,415,382 B1
(45) Date of Patent: Jul. 2, 2002

(54) HARD DISK BOOTSTRAP REDIRECTION

(75) Inventor: Tony G. Kwan, Milpitas, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/302,921

(22) Filed: Apr. 30, 1999

(51) Int. Cl.$^7$ ............................................... G06F 9/445
(52) U.S. Cl. ......................................................... 713/2
(58) Field of Search ............................................. 713/2

(56) References Cited

U.S. PATENT DOCUMENTS

| | | | |
|---|---|---|---|
| 5,269,022 A | | 12/1993 | Shinjo et al. |
| 5,325,532 A | | 6/1994 | Crosswy et al. |
| 5,418,918 A | | 5/1995 | Vander Kamp et al. ..... 395/375 |
| 5,469,573 A | | 11/1995 | McGill, III et al. |
| 5,586,327 A | * | 12/1996 | Bealkowski et al. ........... 713/2 |
| 5,692,190 A | | 11/1997 | Williams |
| 5,694,600 A | | 12/1997 | Khenson et al. ............. 395/652 |
| 5,701,477 A | * | 12/1997 | Chejlava, Jr. ................... 713/2 |
| 5,713,024 A | | 1/1998 | Halladay |
| 5,754,782 A | | 5/1998 | Masada |
| 5,802,363 A | * | 9/1998 | Williams et al. ............... 713/2 |
| 5,933,631 A | | 8/1999 | Mealey et al. |
| 5,944,820 A | * | 8/1999 | Beelitz ....................... 713/2 X |
| 6,016,402 A | | 1/2000 | Thomas et al. |

* cited by examiner

*Primary Examiner*—Thomas M. Heckler
(74) *Attorney, Agent, or Firm*—Martine & Penilla, LLP (57) ABSTRACT

A method for booting a computer system from a selected disk is provided. The selected disk is one of two or more disks that may be connected to the computer system. The method includes reading into memory a first boot select code and reading into memory master boot record (MBR) sector data from an MBR sector location of a primary disk of the computer system. The method then proceeds to merging partition table information of the MBR sector data with the first boot select code to produce boot select MBR sector data. Then, the method moves to where the boot select MBR sector data is written into the MBR sector location to replace the MBR sector data. The method now proceeds to read a second boot select code into memory and then write it to one or more sectors of the primary disk. The boot select MBR sector data is configured to work with the second boot select code to provide a user the ability to boot from any one of the disks connected to the computer system.

16 Claims, 7 Drawing Sheets

HARD DISK BOOTSTRAP REDIRECTION

BACKGROUND OF THE INVENTION

1. Field of the Invention

This invention relates generally to computers, and more particularly to computer code implemented to assist in the boot up process of a computer system.

2. Description of the Related Art

Today's personal computer systems provide users with a high degree of flexibility in terms of the number of peripheral devices that may be connected to a given system. Users are generally able to connect additional internal and external peripheral devices to meet the storage or data access demands required to complete the user's job. By way of example, users can connect additional internal or external hard drives, compact disc (CD) players, digital video disc (DVD) players, compact disc recordables (CD-Rs), etc. Typically, these devices are connected to a system via an IDE or SCSI connection. In some cases, the system will need a host adapter card, such as a SCSI host adapter card, which allows the user to connect between 1 and 15 internal and external SCSI devices.

As computing power for users continues to increase, these users will also experience an increased need for data storage. Although computer hard drives are able to store large volumes of data, users often find it critical to have additional hard drives. These additional hard drives can either be internal or external, and are typically used to store backup copies of important files, other operating systems, or simply more data.

Figure 1:
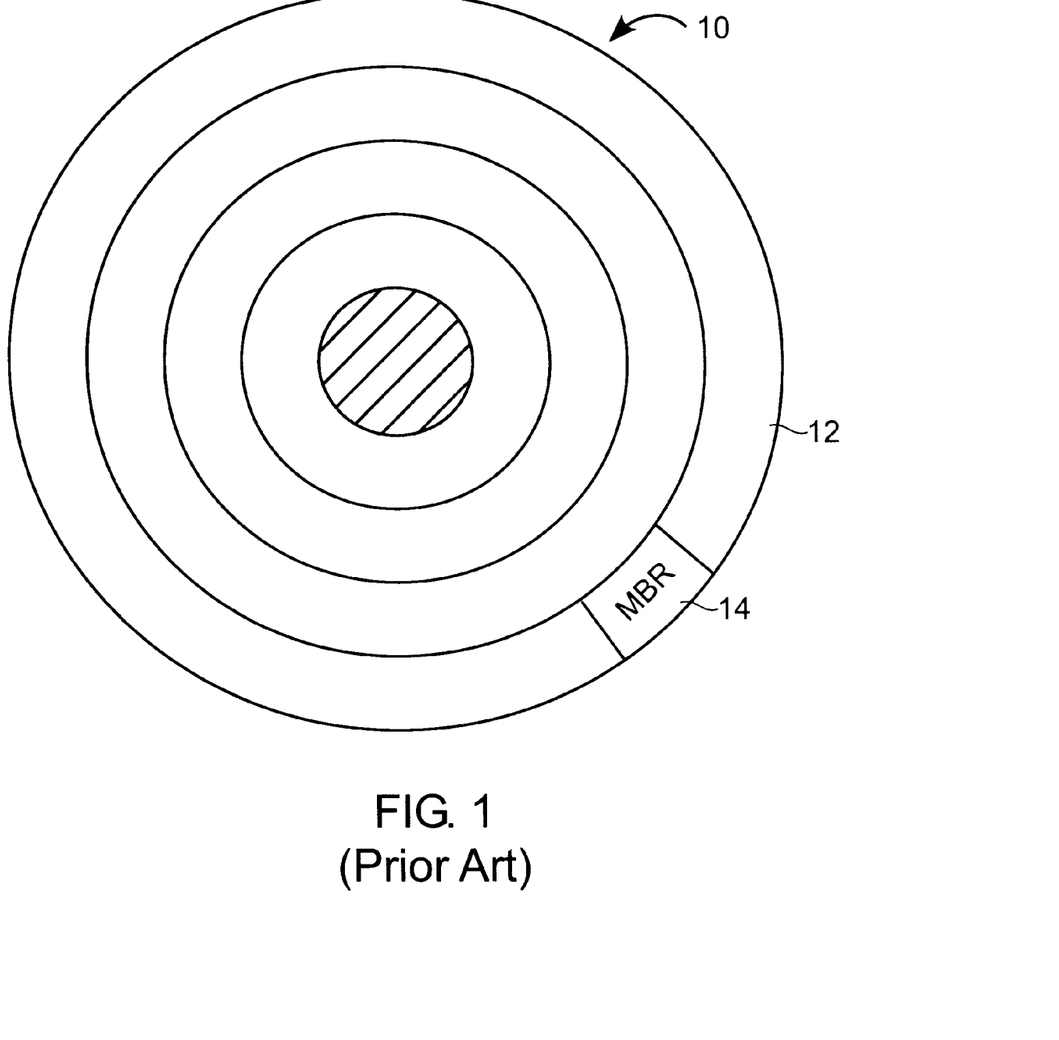
FIG. 1 illustrates a simplified diagram of a computer system hard disk media.

In certain circumstances, the user who previously installed another operating system onto one of the additional hard drives may want to boot the computer system from the additional hard drive. Unfortunately, the system BIOS that controls the initial booting process will not allow booting to a disk other than the primary hard disk. To better understand this limitation, reference is now made to FIG. 1, which is a simplified diagram of a primary disk 10 of the computer system's main hard drive. The primary disk 10 will have an outer track 12, which contains the master boot record (MBR) 14. At bootup, the system BIOS assigns an INT 13 disk number to each of the physical disks that may be connected to the system. The primary disk 10 will always be designated as the boot disk because it is assigned the first disk number, which is 80h. The system BIOS will then call a bootstrap code that is part of the MBR 14 of the primary disk 10. The bootstrap code will examine the disk's partition tables in order to find the active partition that points to the address location of the operating system. At that point, the operating system takes control and completes the bootup process.

As can be appreciated, although computer systems may be configured to have more than one hard drive, users are not easily able to boot from those drives in an easy manner. If the user is a sophisticated user, the user may be able open up the computer system and rearrange the hard drive connections so as to make one of the additional hard drives the primary drive. Although this may work, such a task is time consuming, and may not be practical when the user simply wants to boot from another drive for a short period of time and then wants to return to boot from the primary drive.

In view of the foregoing, there is a need for a method and computer code for enabling a user to select and boot from any hard drive that may be connected to the computer system.

SUMMARY OF THE INVENTION

Broadly speaking, the present invention fills these needs by providing methods, and computer readable media containing program instructions for enabling users of a computer system to boot the computer system from any one of the drives that may be connected to the computer system. It should be appreciated that the present invention can be implemented in numerous ways, including as a process, an apparatus, a system, or a device. Several inventive embodiments of the present invention are described below.

In one embodiment, a method for booting a computer system from a selected disk is disclosed. The selected disk is one of two or more disks that may be connected to the computer system. The method includes reading into memory a first boot select code and reading into memory master boot record (MBR) sector data from an MBR sector location of a primary disk of the computer system. The method then proceeds to merging partition table information of the MBR sector data with the first boot select code to produce boot select MBR sector data (i.e., ABS-1). Then, the method moves to where the boot select MBR sector data is written into the MBR sector location to replace the MBR sector data. The method now proceeds to read a second boot select code (i.e., ABS-2) into memory and then write it to one or more sectors of the primary disk. The boot select MBR sector data is configured to work with the second boot select code to provide a user the ability to boot from any one of the disks connected to the computer system.

In another embodiment, a primary disk media containing program instructions for enabling a user to boot from any disk connected to a computer system is disclosed. The primary disk media contains a first boot select code that includes partition table information. The first boot select code is defined in a master boot record (MBR) location of the primary disk media. A second boot select code is defined in a plurality of sectors following the MBR location. The first boot select code is configured to link with the second boot select code to provide the ability of booting to any one of the disks that are connected to the computer system having the primary disk media.

In yet a further embodiment, an computer readable media containing program instructions for booting a computer system from a selected disk is disclosed. The selected disk is one of two or more disks that may be connected to the computer system. The computer readable media includes: (a) program instructions for reading into memory a first boot select code; (b) program instructions for reading into memory master boot record (MBR) sector data from an MBR sector location of a primary disk of the computer system; (c) program instructions for merging partition table information of the MBR sector data with the first boot select code to produce boot select MBR sector data; (d) program instructions for writing the boot select MBR sector data into the MBR sector location to replace the MBR sector data; (e) program instructions for loading a second boot select code; and (f) program instructions for writing the second boot select code into one or more sectors of the primary disk. The boot select MBR sector data is configured to work with the second boot select code to provide a user the ability to select booting from any one of the disks connected to the computer system.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 2A and 2C provide simplified diagrams of a primary disk, having ABS code (i.e., ABS-1 and ABS-2) for enabling,a. user to selectively boot to any one of the computer system's drives, in accordance with one embodiment of the present invention.

DETAILED DESCRIPTION OF THE PREFERRED EMBODIMENTS

An invention is described for methods for selectively booting to a desired hard drive, and computer readable media containing program instructions for enabling users of a computer system to boot the computer system from any one of the drives that may be connected to the computer system. It will be obvious, however, to one skilled in the art, that the present invention may be practiced without some or all of these specific details. In other instances, well known process operations have not been described in detail in order not to unnecessarily obscure the present invention.

Figure 2A:
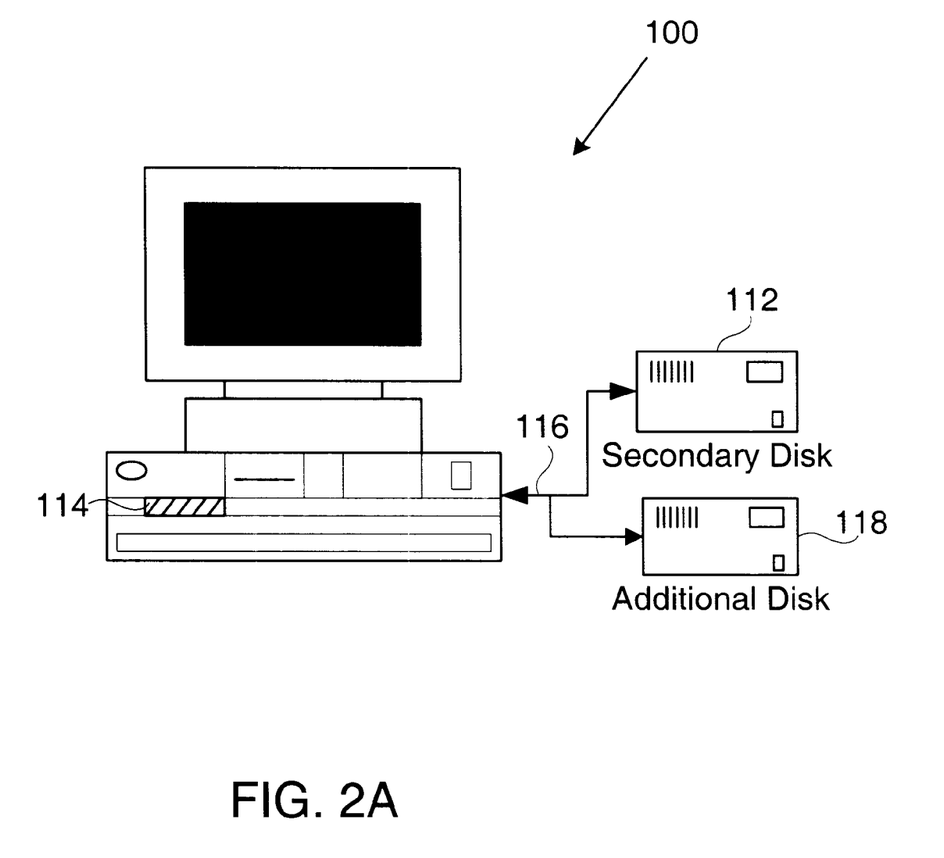
FIG. 2A shows a computer system having an internal hard drive that contains a primary disk, and external hard drives, in accordance with one embodiment of the present invention.

FIG. 2A shows a computer system 100 having an internal hard drive 114 that contains a primary disk, and external hard drives, in accordance with one embodiment of the present invention. As shown, the external hard drives 112 and 118 may be connected to the computer system 100 via external cabling 116, and the hard drives 112 and 118 will include respective hard disks. In this example, hard drive 112 is said to have a secondary disk 112' and hard drive 118 is said to have another disk 118'. In one embodiment of the present invention, the user of the computer system 100 may desire to boot from the operating system of one of the external hard drives 112 or 118 when the internal hard disk becomes corrupt, or simply because the external hard drive contains a different operating system. As will be described below, the present invention discloses bootstrap code that is capable of enabling the user of the computer system 100 to select which hard drive to boot from. In a preferred embodiment, the bootstrap code is written to the primary disk 114' to enable booting to an active partition of a disk that is other than the primary disk 114'.

Figures 2B, 2C:
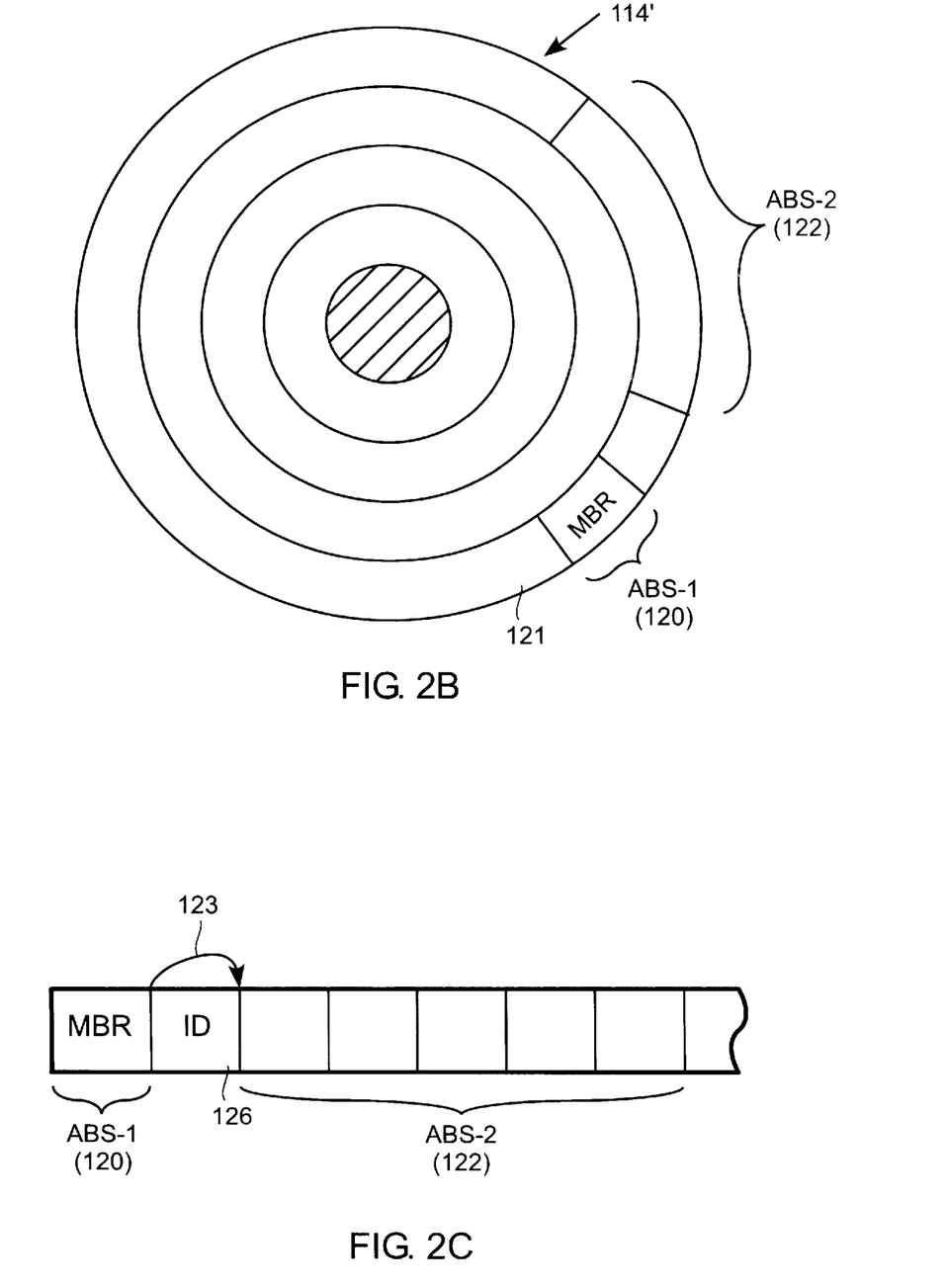

FIG. 2B shows a simplified top view diagram of the primary disk 114' that is part of the internal hard drive 114. The primary disk 114' typically has a plurality of concentric tracks, each track including a plurality of sectors. In an outer track 121 of the primary disk 114', the well known master boot record (MBR) is stored. As described above, the MBR sector contains a bootstrap code and partition table information. When the system BIOS calls on the bootstrap code of the MBR, the bootstrap code will look to the partition table to find the active partition. The Active partition will contain the address location for the operating system that is stored on the primary disk 114'.

In this embodiment, the original MBR of the primary disk 114' is replaced with an Adaptec Boot Select code (ABS-1) 120, which will include partition table information and bootstrap code (e.g., a first boot select code). Also provided is a second Adaptec Boot Select code (ABS-2) 122, which is written to two or more sectors of the outer track 121 in the primary disk 114'. As shown in FIG. 2C, the ABS-1 120 will now replace the code of the original MBR sector, and the ABS-1 120 will be configured to link 123 and communicate with the ABS-2 122. The sector 126 following ABS-1 120 may be used for disk identification (ID) information. For instance, if the primary disk is enabled to perform certain tasks, such as backup operations, a special code can be written into sector 126 to identify the disk as having these capabilities. For this reason, the ABS-2 122 is preferably written on sectors following the sector 126. Of course, if the ID sector is not needed, the ABS-2 122 can be written starting at sector 126.

In one embodiment of the present invention, the ABS-1 120 and ABS-2 122 work together to provide the user with the ability to select booting from any one of the hard drives connected to the computer system 100. The ABS-1 120 and ABS-2 122 therefore provide bootstrap code that will redirect the system BIOS to boot from the selected disk, which may be different than the primary disk. Of course, the user may also select to boot from the primary disk. The redirect boot strapcode resident in ABS-1 120 and ABS-2 122 will thus enable disk number mapping that is configured to assign the selected disk with disk number 80h. As is well known, disk numbers are expressed in hexadecimal form, and therefore, 80 "h" is a hexadecimal number.

Figure 3A:
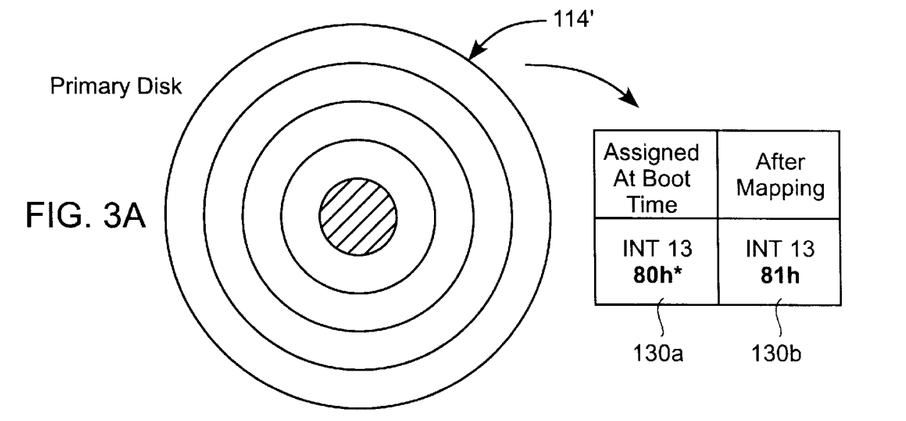
FIGS. 3A through 3C illustrate simplified diagrams of hard disks, which are connected to a computer system, in accordance with one embodiment of the present invention.
Figure 3B:
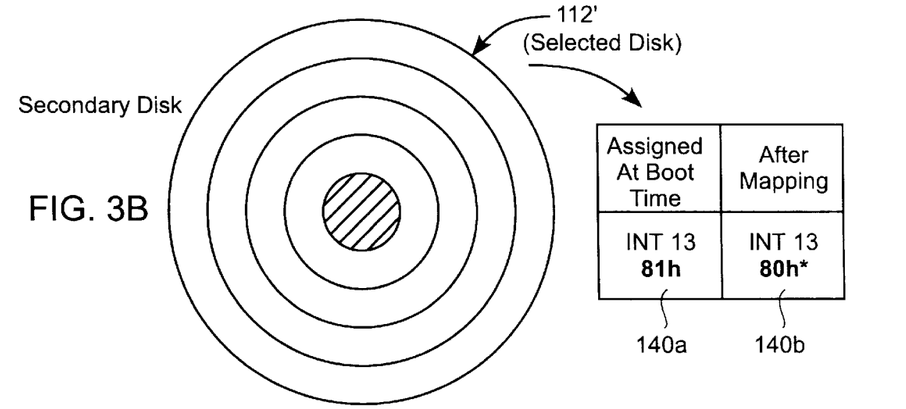
Figure 3C:
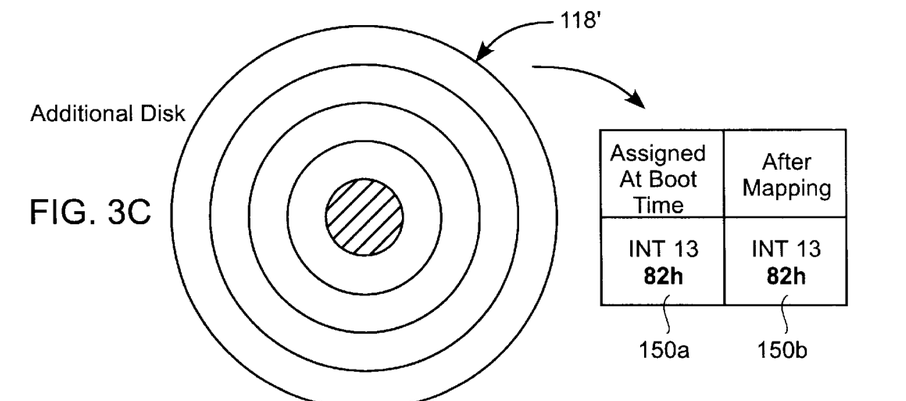

FIGS. 3A through 3C illustrate simplified diagrams of hard disks 114', 112', and 118', which are connected to the computer system 100 of FIG. 2, in accordance with one embodiment of the present invention. As the computer system 100 begins to boot up, the system BIOS will assign each of the disks connected to the computer system 100 (internal and external) with a unique disk number. The disk numbers are assigned starting with 80h, and each of the assigned disk numbers is used by an INT 13 chain. For more information on disk number assignment and INT 13 chains, reference may be made to a commonly assigned U.S. Patent Application, entitled "METHOD FOR SELECTIVELY BOOTING FROM A DESIRED PERIPHERAL DEVICE," having U.S. patent application Ser. No. 09/016,764, and filed on Jan. 30, 1998. This application is herein incorporated by reference.

As is well known, the system BIOS is configured to boot from the disk having disk number 80h when an INT 13 call is made during boot-up. In this example, the primary disk 114' is assigned disk number 80h 130a, disk 112' is assigned disk number 81h 140a, and disk 118' is assigned disk number 82h 150a. If the user desires to boot from the secondary disk 112' (e.g., SELECTED DISK), the ABS code that was written to the first track of the primary disk 114' will provide this functionality. By way of example, the ABS code is configured to provide the user the ability to select a disk and, once the selection is completed, the ABS code will perform disk number mapping.

As shown in FIGS. 3A–3C, disk number mapping is complete when disk number 80h 140b is assigned to the secondary disk 112' and disk number 81h 130b is assigned to the primary disk 114'. In this example, the additional disk 118' will remain the same and no disk number mapping will be performed with regard to this disk. Now that the secondary disk 112' is mapped with disk number 80h, when the system BIOS issues an INT 13 call, the computer will boot from the operating system of the selected disk.

Figure 4A:
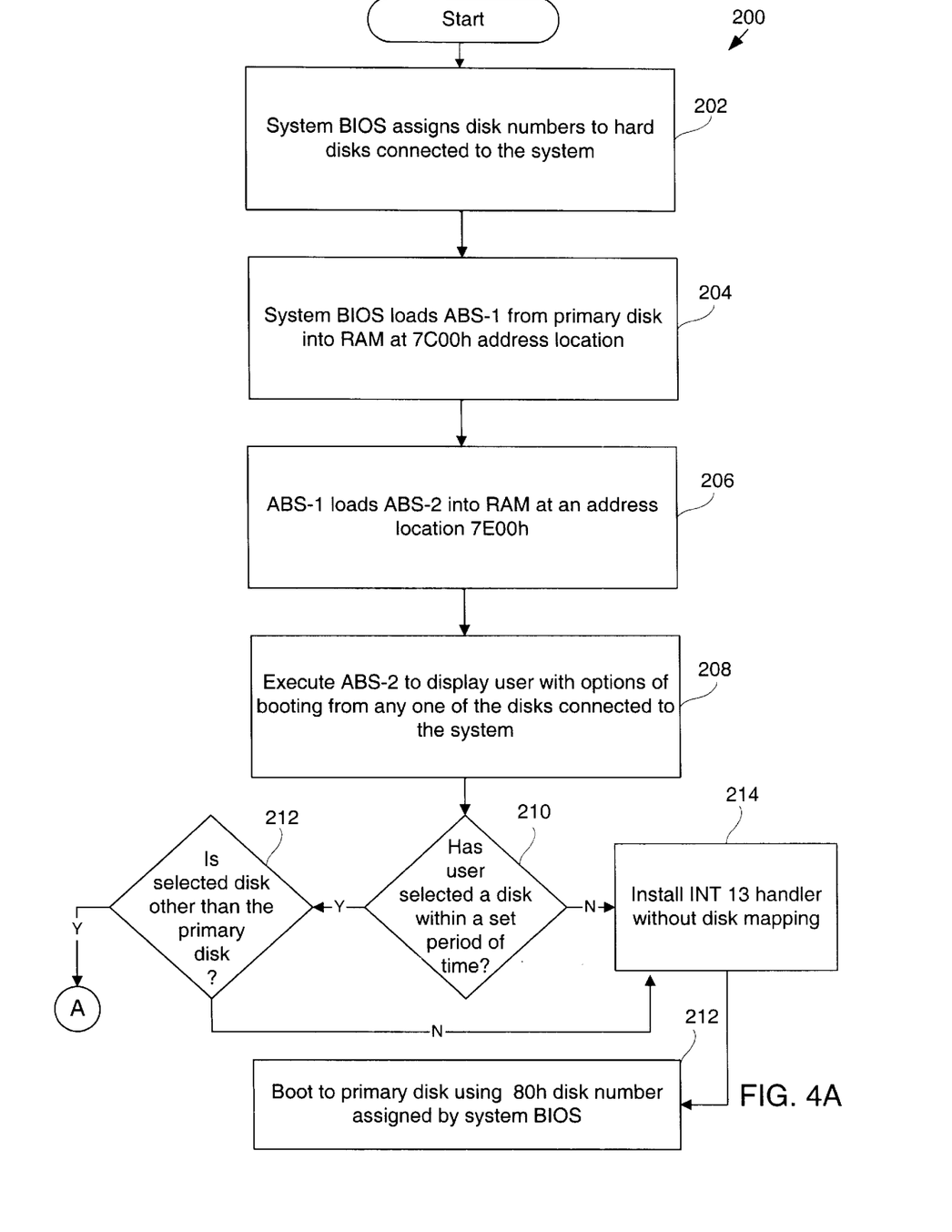
FIGS. 4A and 4B show a flowchart diagram that depicts the method operations performed when a user desires to select a disk from which the computer system will boot from, in accordance with one embodiment of the present invention.

FIG. 4A is a flowchart diagram 200 identifying the method operations performed when a user desires to select a disk from which the computer system will boot from, in accordance with one embodiment of the present invention. The method begins at an operation 202 where the system BIOS will assign disk numbers to the hard disks that are connected to the computer system. In general, the system BIOS will assign disk numbers to all of the disks connected to the computer system beginning with the primary hard disk, which is assigned disk number 80h.

Assuming that the ABS code has been written to the primary disk 114' (as described with reference to FIG. 6), the method will proceed to an operation 204 where the system BIOS will load the ABS-1 from the primary disk into RAM at location 7C00h. Once the ABS-1 has been loaded into RAM, the method will proceed to an operation 206 where the ABS-1 loads ABS-2 into RAM at an address location 7E00h. After ABS-1 and ABS-2 are loaded into RAM, the method will advance to an operation 208 where ABS-2 is executed to display the user with options as to booting from any one of the disks connected to the computer system. This display may be by way of a graphical user interface (GUI) or text interface that will allow the user to select the desired hard drive.

The method then advances to a decision operation 210 where it is determined whether the user has selected a disk within a set period of time. In one embodiment, the set period of time may be about 15 seconds. If it is determined that the user did not select a drive to boot from within the set period of time, the method will proceed to an operation 214 where an INT 13 handler that is part of the ABS code is installed without enabling disk mapping. The INT 13 handler is configured to assist in booting the computer system to the primary disk using disk number 80h that was assigned by the system BIOS. If the user does select a disk within the set period of time, the method will proceed to a decision operation 212 where it is determined whether the selected disk is other than the primary disk.

If the selected disk is the primary disk, the method will again proceed to operation 214 and then to operation 216 where the computer system is booted from the primary disk. On the other hand, if it is determined in operation 212 that the selected disk is other than the primary disk, the method will proceed to operation 218 of FIG. 4B where the INT 13 handler is installed with disk number mapping enabled.

Figure 4B:
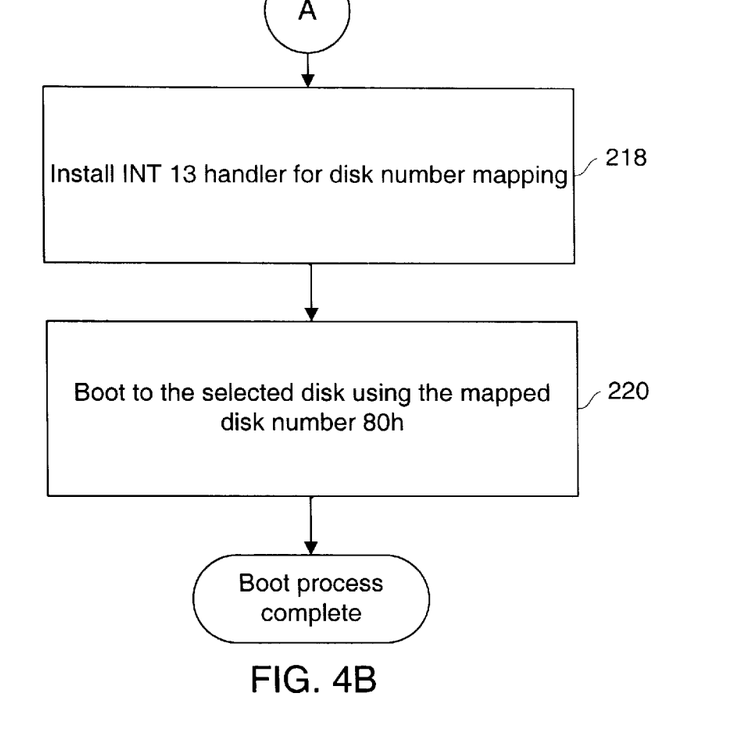
Figure 5:
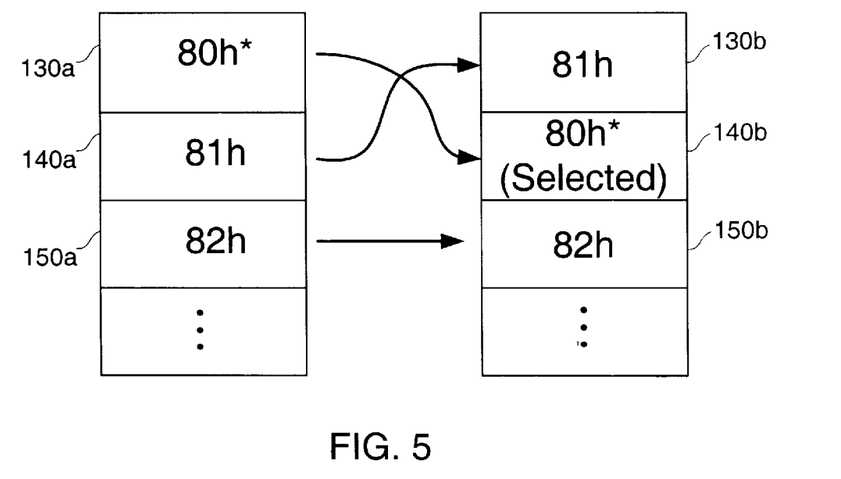
FIG. 5 is a block diagram of the mapping performed by the ABS code in order to enable booting from a selested drive, in accordance with one embodiment of the present invention.

In this embodiment, disk number mapping is performed as shown in FIG. 5. In this simplified example, the selected disk is the secondary disk 212' of FIG. 3B. In such a case, the disk number 80h will be mapped to the secondary disk and 81h, which was previously assigned to the secondary disk is assigned to the primary disk 214'. Accordingly, after disk mapping, disk number 81h 130b is assigned to the primary disk, disk number 80h 140b is assigned to the secondary disk, and disk number 82h remains assigned to the additional disk 150b. The method will then advance to an operation 220 where the computer system will be booted from the selected disk using the mapped disk number 80h.

At this point, the boot process will be complete and the operating system of the desired disk will load allowing normal operation of the computer system.

Figure 6:
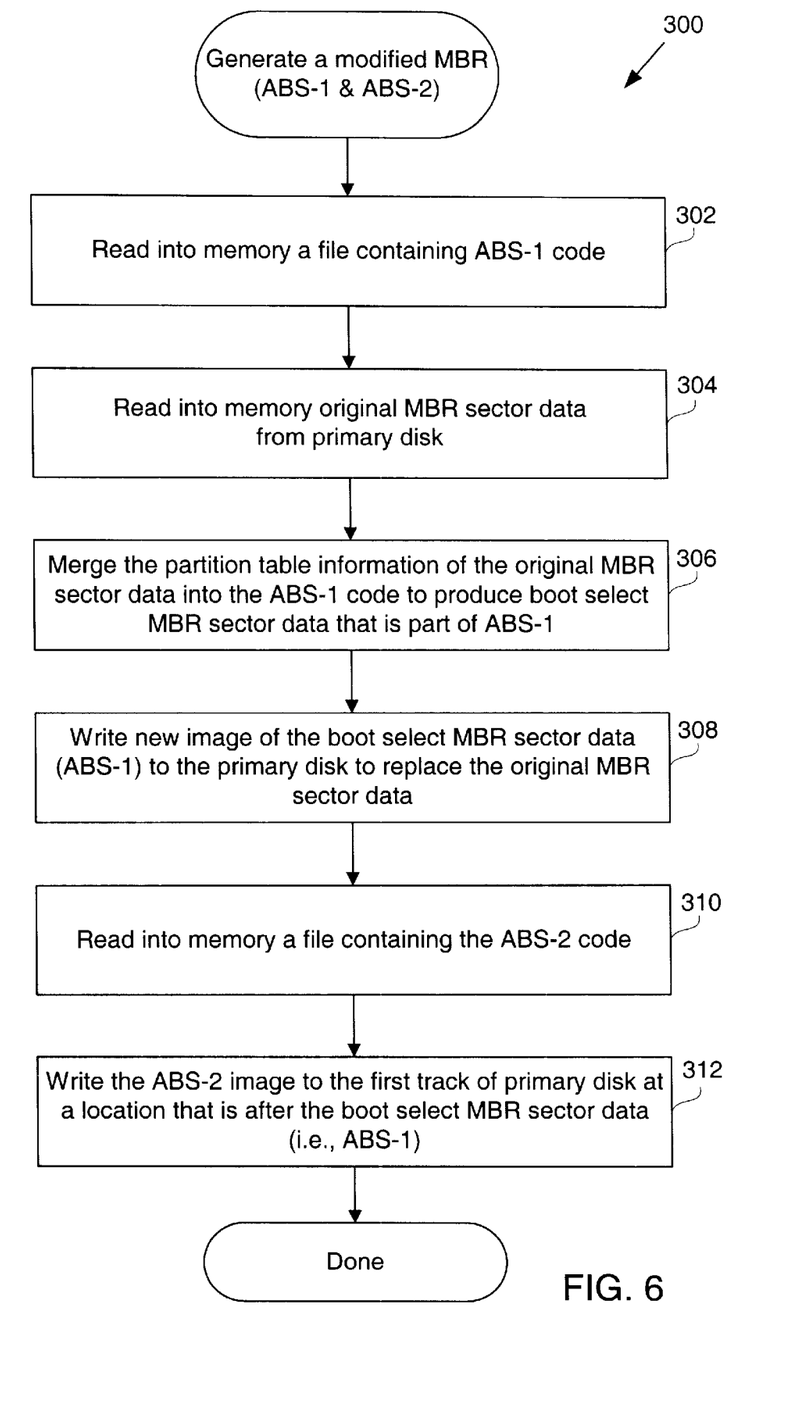
FIG. 6 a flowchart diagram that identifies the method operations performed in generating a modified MBR that includes ABS-1 and ABS-2, in accordance with one embodiment of the present invention.

FIG. 6 illustrates a flowchart diagram 300 identifying the method operations performed in generating a modified MBR that includes ABS-1 and ABS-2, in accordance with one embodiment of the present invention. The method begins at an operation 302 where a file containing the ABS-1 code is read in memory. By way of example, the ABS-1 code may be provided to the user of the computer system by way of a diskette, a compact disc, over a network (e.g., over a LAN or Internet), or via any computer readable media. Once the file containing the ABS-1 code is read into memory, the method will proceed to an operation 304 where the original MBR sector data is read into memory from the primary disk. In general, the primary disk 114' of the computer system 100 will originally have an MBR sector that includes basic bootstrap code and partition table information.

Now, the method proceeds to an operation 306 where the partition table information of the original MBR sector data is merged with the ABS-1 code (thus defining boot select MBR sector data), which includes part of the redirect bootstrap code of the present invention. The method moves to an operation 308 where the new image of the ABS-1 is written to the primary disk to replace the original MBR data. The method then proceeds to an operation 310 where a file containing the ABS-2 code is read. As with the ABS-1 code, the ABS-2 code may be provided by way of a diskette, compact disc, or via any computer readable media. The method then proceed to an operation 312 where the ABS-2 image is written to the first track of the primary disk at a location that is after the ABS-1 code. At this point, the method of generating a modified MBR and preparing the primary disk with the modified MBR code will be done.

The ability of booting to a drive that is other than the primary drive is also important for systems having intelligent backup and recovery capabilities. In such systems, a second drive (which may be a hard drive or removable drive) is used to backup the data of the primary drive on a regular schedule. If the primary drive fails to boot due to corrupted operating system files, the computer system may be rebooted from the second drive, and the corrupted files on the primary drive can be repaired by copying the data from the secondary drive back to the primary drive, and then, the user can once again continue to work from the primary drive uninterrupted. Accordingly, in such systems, there is great need to be able to boot from a drive that is other than the primary drive. The embodiments of the present invention therefore provide these capabilities. For more information on such intelligent backup systems, reference may be made to U.S. patent application Ser. No. 09/256,687, filed on Feb. 23, 1999, and entitled "Method for Managing Primary and Secondary Storage Devices in an Intelligent Backup and Restoring System." This application is hereby incorporated by reference.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for booting a computer system from a selected disk, where the selected disk is one of two or more disks connected to the computer system, the method for booting comprising:

reading into memory a first boot select code;

reading into memory master boot record (MBR) sector data from an MBR sector location of a primary disk of the computer system;

merging partition table information of the MBR sector data with the first boot select code to produce boot select MBR sector data;

writing the boot select MBR sector data into the MBR sector location to replace the MBR sector data;

loading a second boot select code; and writing the second boot select code into one or more sectors of the primary disk, the boot select MBR sector data being configured to work with the second boot select code to provide a user the ability to select booting from any one of the disks connected to the computer system.

2. A method for booting a computer system from a selected disk as recited in claim 1, wherein the MBR sector location is in an outer track of the primary disk, and the MBR sector location contains the boot select MBR data that includes the first boot select code and the partition table information.

3. A method for booting a computer system from a selected disk as recited in claim 2, wherein the one or more sectors of the primary disk containing the boot select code are located in the outer track of the primary disk.

4. A method for booting a computer system from a selected disk as recited in claim 1, wherein when a bootup is commenced, the method for booting comprises:

assigning each of the disks connected to the computer system a disk number, starting with the assignment of designating the primary disk with 80h;

loading the boot select MBR sector data from the primary disk into memory, the boot select MBR sector data being configured to load the second boot select code into memory;

executing the second boot select code.

5. A method for booting a computer system from a selected disk as recited in claim 4, wherein the executing of the select boot select code is configured to prompt the user to select a disk to boot from within a period of time.

6. A method for booting a computer system from a selected disk as recited in claim 5, further comprising:

if the user selects the primary disk, the method includes, installing an INT 13 handler without disk mapping to enable booting to the primary disk using the assigned disk number 80h.

7. A method for booting a computer system from a selected disk as recited in claim 5, further comprising:

if the user selects a disk other than the primary disk, the method includes,
installing an INT 13 handler that is configured to perform disk number mapping.

8. A method for booting a computer system from a selected disk as recited in claim 7, wherein when disk number mapping is performed, the 80h disk number assigned to the primary disk is reassigned to the selected disk that is other than the primary disk.

9. A method for booting a computer system from a selected disk as recited in claim 8, wherein after the disk number mapping is performed, the computer system can be booted from the selected disk that is other than the primary disk.

10. A computer readable media containing program instructions for booting a computer system from a selected disk, where the selected disk is one of two or more disks connected to the computer system, the computer readable media comprising:

program instructions for reading into memory a first boot select code;

program instructions for reading into memory master boot record (MBR) sector data from an MBR sector location of a primary disk of the computer system;

program instructions for merging partition table information of the MBR sector data with the first boot select code to produce boot select MBR sector data;

program instructions for writing the boot select MBR sector data into the MBR sector location to replace the MBR sector data;

program instructions for loading a second boot select code; and program instructions for writing the second boot select code into one or more sectors of the primary disk, the boot select MBR sector data being configured to work with the second boot select code to provide a user the ability to select booting from any one of the disks connected to the computer system.

11. A computer readable media containing program instructions for booting a computer system from a selected disk as recited in claim 10, wherein the MBR sector location is in an outer track of the primary disk, and the MBR sector location contains the boot select MBR data that includes the first boot select code and the partition table information.

12. A computer readable media containing program instructions for booting a computer system from a selected disk as recited in claim 10, wherein when a bootup is commenced, the method for booting comprises:

program instructions for assigning each of the disks connected to the computer system a disk number, starting with the assignment of designating the primary disk with 80h;

program instructions for loading the boot select MBR sector data from the primary disk into memory, the boot select MBR sector data being configured to load the second boot select code into memory; and program instructions for executing the second boot select code.

13. A computer readable media containing program instructions for booting a computer system from a selected disk as recited in claim 12, wherein the executing of the select boot select code is configured to prompt the user to select a disk to boot from within a period of time.

14. A computer readable media containing program instructions for booting a computer system from a selected disk as recited in claim 13, further comprising:

if the user selects the primary disk, the computer readable media further includes, program instructions for installing an INT 13 handler without disk mapping to enable booting to the primary disk using the assigned disk number 80h.

15. A computer readable media containing program instructions for booting a computer system from a selected disk as recited in claim 13, further comprising:

if the user selects a disk other than the primary disk, the computer readable media further includes, program instructions for installing an INT 13 handler that is configured to perform disk number mapping.

16. A computer readable media containing program instructions for booting a computer system from a selected disk as recited in claim 15, wherein when disk number mapping is performed, the 80h disk number assigned to the primary disk is reassigned to the disk that is other than the primary disk.

* * * * *